United States Patent
Ueda et al.

(10) Patent No.: US 12,471,500 B2
(45) Date of Patent: Nov. 11, 2025

(54) MAGNETIC MEMORY WITH A WIRING AND MAGNETIC MEMBERS EACH HAVING A MAGNETIC DOMAIN MAGNETIZED BY A CURRENT FLOWING THROUGH THE WIRING

(71) Applicant: KIOXIA CORPORATION, Tokyo (JP)

(72) Inventors: Yoshihiro Ueda, Yokohama Kanagawa (JP); Naoharu Shimomura, Meguro Tokyo (JP); Tsuyoshi Kondo, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 746 days.

(21) Appl. No.: 17/681,850

(22) Filed: Feb. 28, 2022

(65) Prior Publication Data
US 2023/0071519 A1 Mar. 9, 2023

(30) Foreign Application Priority Data
Sep. 3, 2021 (JP) ................. 2021-144303

(51) Int. Cl.
*H10N 50/80* (2023.01)
*H10B 61/00* (2023.01)
*H10N 50/85* (2023.01)

(52) U.S. Cl.
CPC ............. *H10N 50/80* (2023.02); *H10B 61/22* (2023.02); *H10N 50/85* (2023.02)

(58) Field of Classification Search
None
See application file for complete search history.

(56) References Cited

U.S. PATENT DOCUMENTS

| 8,830,742 | B2 | 9/2014 | Kondo et al. |
| 2015/0262702 | A1 | 9/2015 | Ootera et al. |
| 2019/0088346 | A1* | 3/2019 | Ootera ............ H10B 61/22 |
| 2020/0303027 | A1 | 9/2020 | Ueda et al. |

(Continued)

FOREIGN PATENT DOCUMENTS

| JP | 5592909 B2 | 9/2014 |
| JP | 2015-173145 A | 10/2015 |

(Continued)

*Primary Examiner* — Christine S. Kim
*Assistant Examiner* — Tyler J Wiegand
(74) *Attorney, Agent, or Firm* — Kim & Stewart LLP

(57) ABSTRACT

A magnetic memory includes an electrode extending along a plane including first and second directions, first and second wirings extending along the first direction, a first magnetic member including first and second portions coupled to the first wiring and the electrode, a second magnetic member including third and fourth portions coupled to the second wiring and the electrode, the first and second members extending along the third direction, a third wiring extending along the second direction between the electrode and the second and fourth portions, and a circuit configured to supply a current to the third wiring to magnetize in a first magnetization direction a magnetic domain of each of the second and fourth portions, the magnetic domain storing information represented by magnetization directions thereof, and supply a current between the electrode and the first and second wirings to shift the magnetic domains towards the first and third portions.

9 Claims, 7 Drawing Sheets

(56) References Cited

U.S. PATENT DOCUMENTS

| 2021/0082484 | A1 | 3/2021 | Ueda et al. |
| 2021/0249061 | A1* | 8/2021 | Arnaud Quinsat .......................... G11C 19/0841 |
| 2022/0293678 | A1 | 9/2022 | Ueda |

FOREIGN PATENT DOCUMENTS

| JP | 2020-155178 A | 9/2020 |
| JP | 2021-048190 A | 3/2021 |
| JP | 2022-138916 A | 9/2022 |

\* cited by examiner

MAGNETIC MEMORY WITH A WIRING AND MAGNETIC MEMBERS EACH HAVING A MAGNETIC DOMAIN MAGNETIZED BY A CURRENT FLOWING THROUGH THE WIRING

CROSS-REFERENCE TO RELATED APPLICATION

This application is based upon and claims the benefit of priority from Japanese Patent Application No. 2021-144303, filed Sep. 3, 2021, the entire contents of which are incorporated herein by reference.

FIELD

Embodiments of the present disclosure described herein relate generally to a magnetic memory.

BACKGROUND

A magnetic memory in which a magnetic wall of a magnetic member formed of a magnetic material is moved or shifted by a current (hereinafter referred to as a shift current) passing through the magnetic member is known. In such a magnetic memory, a magnetization direction is written to the magnetic member by a write current passing through a write wiring or a field line disposed close to the magnetic member. The written magnetization direction corresponds to stored bit information. Accordingly, the write energy consumption per bit may become large.

DETAILED DESCRIPTION

Figure 1:
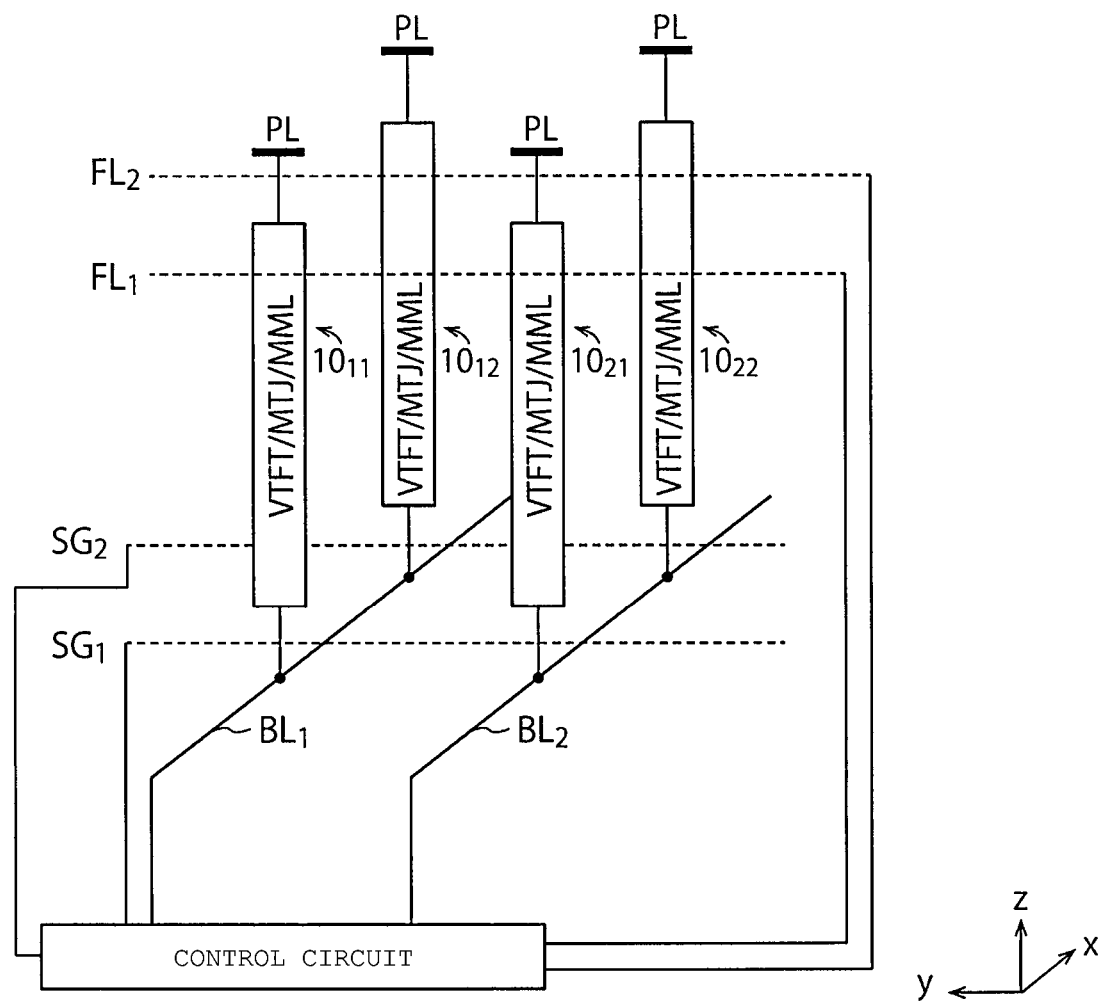
FIG. 1 is a perspective view of a magnetic memory according to a first embodiment.

Embodiments provide a magnetic memory having a reduced a write current per bit.

In general, according to one embodiment, a magnetic memory includes an electrode extending along a plane including a first direction and a second direction intersecting the first direction, first and second wirings extending along the first direction, a first magnetic member including a first portion electrically coupled to the first wiring and a second portion electrically coupled to the electrode, the first magnetic member extending along a third direction intersecting the first and second directions, a second magnetic member including a third portion electrically coupled to the second wiring and a fourth portion electrically coupled to the electrode, the second magnetic member extending along the third direction, a third wiring extending along the second direction between the electrode and each of the second and fourth portions, and a control circuit electrically coupled to the first, second, and third wirings and the electrode. The control circuit is configured to supply a first current to the third wiring to generate a magnetic field and magnetize in a first magnetization direction a magnetic domain of each of the second and fourth portions, the magnetic domain storing information represented by magnetization directions thereof, and supply a second current between the electrode and each of the first and second wirings to respectively shift the magnetic domains of the second and fourth portions towards the first and third portions.

Hereinafter, certain example embodiments of the present disclosure will be described with reference to the drawings. The drawings are schematic or conceptual, and the relationship between the depicted dimensions (thickness and length/width) of each part or component, the ratio of the sizes of the parts and components, and the like are not always the same as the actual ones. Likewise, the dimensions of the same part may be represented differently depending on the drawing. In present disclosure, the same elements are designated using the same reference numerals, and the description of such elements may be omitted.

First Embodiment

A magnetic memory according to a first embodiment will be described with reference to FIGS. 1 to 6. As shown in FIG. 1, the magnetic memory of the first embodiment has a plurality of memory units $10_{ij}$ (where i=1 to m and j=1 to n) disposed in m rows and n columns where m and n are natural numbers. FIG. 1 shows memory units $10_{11}$ to $10_{22}$ disposed in 2 rows and 2 columns. The magnetic memory of the present embodiment further includes a plate electrode PL, a plurality of field lines $FL_j$ (j=1 and 2), a plurality of electrode wirings (hereinafter, also referred to as a gate electrode portions) $SG_j$ (j=1 and 2), and a control circuit 100. The plate electrode PL is an electrode parallel to a plane including an x-direction along the x-axis and a y-direction along the y-axis. The length of the plate electrode PL in the x direction is greater than the length of each field line $FL_j$ (j=1 and 2) in the x direction. Each electrode wiring $SG_j$ (j=1 and 2) also serves as a gate electrode of a vertical thin film transistor described later.

Figure 2:
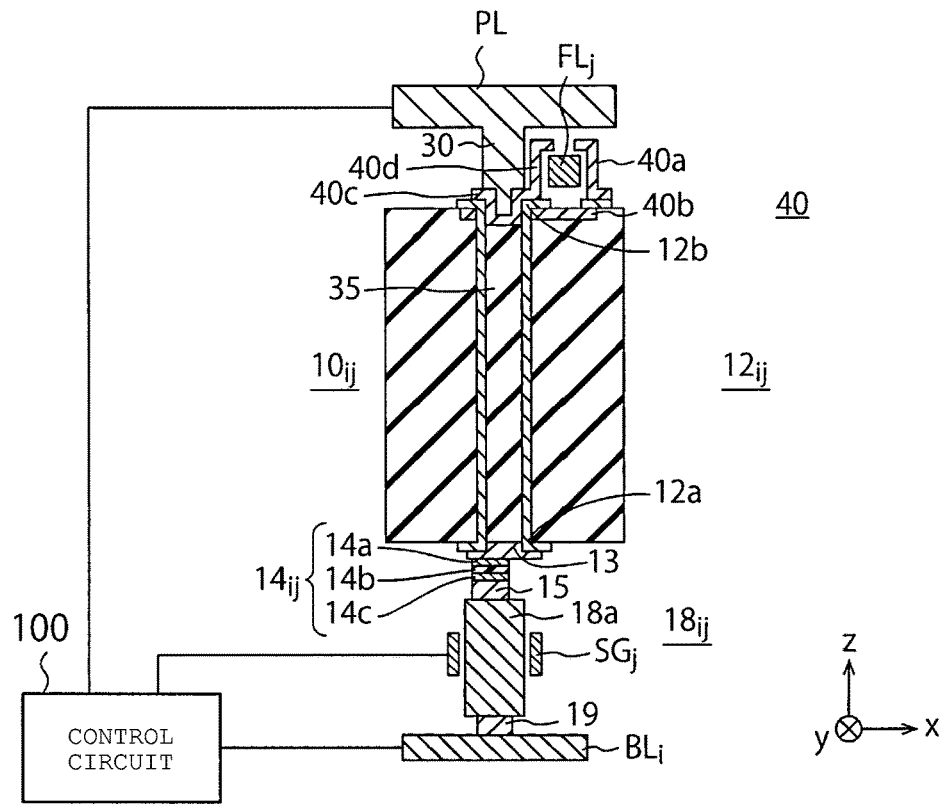
FIG. 2 is a cross-sectional view showing a memory unit in a magnetic memory of a first embodiment.

As shown in FIG. 2, each memory unit $10_{ij}$ (i, j=1 and 2) includes a magnetic member $12_{ij}$, a magnetoresistive element $14_{ij}$, and a vertical thin film transistor $18_{ij}$. Each magnetic member $12_{ij}$ (i, j=1 and 2) has a first end portion 12a and a second end portion 12b, is composed of a vertical magnetic material extending along a first direction parallel to the Z-axis (hereinafter sometimes referred to as the z direction) along the first end portion 12a to the second end portion 12b, and has a cylindrical shape. For example, the magnetic member $12_{ij}$ (i, j=1 and 2) may have an outer shape in a cross section to be any one of a circle, an ellipse, or a polygon when cut in a plane perpendicular to the z direction. Since the magnetic member $12_{ij}$ (i, j=1 and 2) is composed of a vertical magnetic material, the easy axis of magnetization is in the direction perpendicular to the z direction. Accordingly, the magnetic member $12_{ij}$ (i, j=1 and 2) has a magnetization direction in the radial direction and has an outward magnetization direction or an inward magnetization direction. An insulator portion 35 is disposed in the magnetic member $12_{ij}$ (i, j=1 and 2). That is, the magnetic member $12_{ij}$ (i, j=1 and 2) surrounds the outer periphery of the insulator portion 35.

Figure 3:
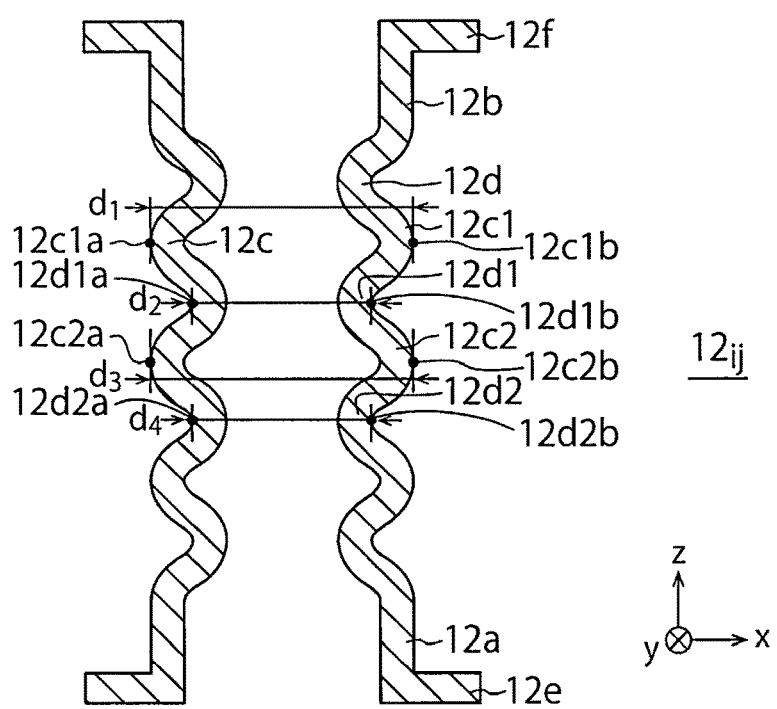
FIG. 3 is a cross-sectional view showing a shape of a magnetic member.

In FIG. 2, the magnetic member $12_{ij}$ (i, j=1 and 2) is shown to have a shape extending linearly from the first end portion 12a toward the second end portion 12b, but in reality, as shown in FIG. 3, includes a plurality of protruding portions 12c arranged along the z direction, and a depressed portion 12d arranged on the outer surface of the magnetic member $12_{ij}$ (i, j=1 and 2) is positioned between two of the protruding portions 12c. Further, the protruding portions 12c have at least one magnetic domain. In the magnetic member $12_{ij}$ (i, j=1 and 2), when a drive current (also referred to as a shift current) is supplied between the first end portion 12a and the second end portion 12b, the magnetic wall of the magnetic member $12_{ij}$ (i, j=1 and 2) moves along the z direction, and in a state in which the drive current is not supplied, the magnetic wall stops at the depressed portion 12d. In the magnetic member $12_{ij}$ (i, j=1 and 2), the first end portion 12a is electrically coupled to a bit wiring $BL_i$, and the second end portion 12b is electrically coupled to the plate electrode PL. In the present disclosure, the phrase "A is electrically coupled to B" and the like means that A and B may be directly coupled or may be indirectly coupled via a conductor, a resistance changing portion (e.g., a magnetoresistive element, or the like), a switching unit (for example, a selector, a transistor, or the like), or the like.

In the magnetic member $12_{ij}$ (i, j=1 and 2), as shown in FIG. 3, a protruding portion 12c1, a depressed portion 12d1, a protruding portion 12c2, and a depressed portion 12d2 are disposed along the z direction. When the distance between an end portion 12c1a and an end portion 12c1b of the protruding portion 12c1 in the x direction in the cross section cut in the plane parallel to the z direction of the protruding portion 12c1 is defined as d1, the distance between an end portion 12d1a and an end portion 12d1b of the depressed portion 12d1 in the x direction in the cross section cut in the plane parallel to the z direction of the depressed portion 12d1 is defined as d2, the distance between an end portion 12c2a and an end portion 12c2b of the protruding portion 12c2 in the x direction in the cross section cut in the plane parallel to the z direction of the protruding portion 12c2 is defined as d3, and the distance between an end portion 12d2a and an end portion 12d2b of the depressed portion 12d2 in the x direction in the cross section cut in the plane parallel to the z direction of the depressed portion 12d2 is defined as d4, the following conditions are satisfied:

$$d1>d2, d1>d4, \text{ and}$$

$$d3>d2, d3>d4.$$

The distances d1, d2, d3, d4 taken in cross-section correspond to diameters (outer diameters) of the magnetic members $12_{ij}$.

In the magnetic member $12_{ij}$ (i, j=1 and 2), at the first end portion 12a, a flange portion 12e extending along a surface intersecting in the z direction is provided, and at the second end portion 12b, a flange portion 12f extending along a surface intersecting in the z direction is provided. The flange portions 12e and 12f include the same vertical magnetic material as the magnetic member $12_{ij}$ (i, j=1 and 2). The first end portion 12a of the magnetic member $12_{ij}$ (i, j=1 and 2) is electrically coupled to the magnetoresistive element 14 via the flange portion 12e and a non-magnetic conductive layer 13 (see FIG. 2). The non-magnetic conductive layer 13 may be deleted. In such a case, the first end portion 12a of the magnetic member $12_{ij}$ (i, j=1 and 2) is electrically coupled to the magnetoresistive element 14 via the flange portion 12e.

The magnetoresistive element $14_{ij}$ (i, j=1 and 2) reads out the information written in the magnetic member $12_{ij}$ (i, j=1 and 2), and is made of, for example, a magnetic tunnel junction (MTJ) element. Hereinafter, the magnetoresistive element $14_{ij}$ (i, j=1 and 2) will be described as an MTJ element. The MTJ element $14_{ij}$ (i, j=1 and 2) includes a magnetization free layer 14a with a variable magnetization direction, a magnetization fixed layer 14c with a fixed magnetization direction, and a non-magnetic insulating layer 14b disposed between the free layer 14a and the fixed layer 14c. The non-magnetic insulating layer may be referred to as the tunnel barrier layer. In the MTJ element $14_{ij}$ (i, j=1 and 2), the free layer 14a is electrically coupled to the first end portion 12a of a magnetic member 12 via the non-magnetic conductive layer 13, and the fixed layer 14c is electrically coupled to the bit wiring BL. Here, "the magnetization direction is variable" means that the magnetization direction can be changed by the leakage magnetic field from the magnetic member $12_{ij}$ (i, j=1 and 2) in the read operation described later, and "the magnetization direction is fixed" means that the magnetization direction does not change due to the leakage magnetic field from the magnetic member $12_{ij}$ (i, j=1 and 2).

The vertical thin film transistor $18_{ij}$ (i, j=1 and 2) has one end electrically coupled to the fixed layer 14c of the magnetoresistive element $14_{ij}$ via a non-magnetic conductive layer 15 and the other end electrically coupled to the bit wiring $BL_i$ via a non-magnetic conductive layer 19, and includes a channel layer 18a extending along the z direction and a gate electrode portion $SG_j$ that surrounds or sandwiches the channel layer 18a. That is, the gate electrode portion $SG_j$ covers at least a portion of the channel layer 18a. The channel layer 18a includes, for example, crystalline silicon. The gate electrode portion $SG_j$ extends along the y direction.

Further, the second end portion 12b of the magnetic member $12_{ij}$ (i, j=1 and 2) is electrically coupled to the plate electrode PL via a non-magnetic conductor 30. That is, the plate electrode PL is shared by each memory unit $10_{ij}$ (i, j=1 and 2). One end of the non-magnetic conductor 30 is positioned inside the second end portion 12b of the magnetic member $12_{ij}$.

The field line $FL_j$ (j=1 and 2) extends along the y direction and is disposed between the flange portion 12f of the second end portion 12b and the plate electrode PL. The field line $FL_1$ is provided for the memory units $10_{11}$ and $10_{21}$, and the field line $FL_2$ is provided for the memory units $10_{12}$ and $10_{22}$. A yoke 40 surrounds the field line $FL_j$ (j=1 and 2). The yoke 40 includes a first portion 40a, a second portion 40b, a third portion 40c, and a fourth portion 40d, and forms a magnetic circuit that strengthens the magnetic field generated when a current is passed through the field line $FL_j$ (j=1 and 2).

The first portion 40a of the yoke 40 covers a portion of the upper surface of the field line $FL_j$ (j=1 and 2) and the side surface opposite to the non-magnetic conductor 30. The second portion 40b is disposed below the field line $FL_j$ (j=1 and 2) and the flange portion 12f of the magnetic member $12_{ij}$ (i, j=1 and 2), and surrounds the second end portion 12b of the magnetic member $12_{ij}$ (i, j=1 and 2). The third portion 40c covers the upper surface of the flange portion 12f and one end of the non-magnetic conductor 30. That is, since the end of the non-magnetic conductor 30 positioned inside the second end portion 12b of the magnetic member $12_{ij}$, (j=1 and 2) is covered, this covering portion of the third portion $40c$ is disposed inside the second end portion $12b$. The fourth portion $40d$ is coupled to the third portion $40c$ and covers the side surface of the field line FL on the side of the non-magnetic conductor 30 and a portion of the upper surface of the field line $FL_j$ (j=1 and 2).

The plate electrode PL, the bit wiring $BL_i$ (i=1 and 2), the gate electrode portion $SG_j$, and the field line $FL_j$ (j=1 and 2) are electrically coupled to the control circuit 100. A constant voltage can be applied to the plate electrode PL.

Figure 4:
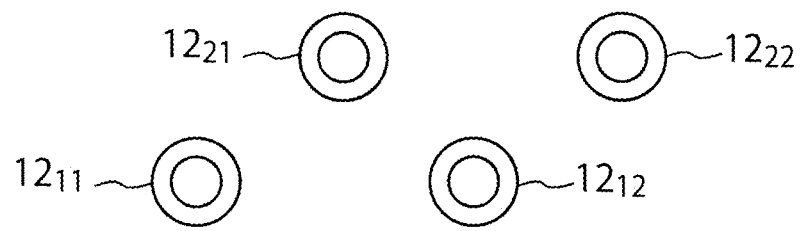
FIG. 4 is a plan view of magnetic members arranged in a magnetic memory of a first embodiment.

In the first embodiment, it is preferable that the magnetic members $12_{11}$ to $12_{22}$ are disposed such that, as shown in FIG. 4, the magnetic members $12_{11}$ and $12_{12}$ arranged in the first row and the magnetic members $12_{21}$ and $12_{22}$ arranged in the second row are dense (closely spaced). That is, when m and n are natural numbers, it is preferable that the magnetic member $12_{(m+1)n}$ in the (m+1)th row and the nth column is disposed at a position of the (m+1)th row between the magnetic member $12_{mn}$ in the mth row and the nth column and the magnetic member $12_{m(n+1)}$ in the mth row and the (n+1)th column. In this way, the plurality of magnetic members are densely disposed, so that it is possible to obtain higher integration (that is, smaller device sizes).

Figure 5:
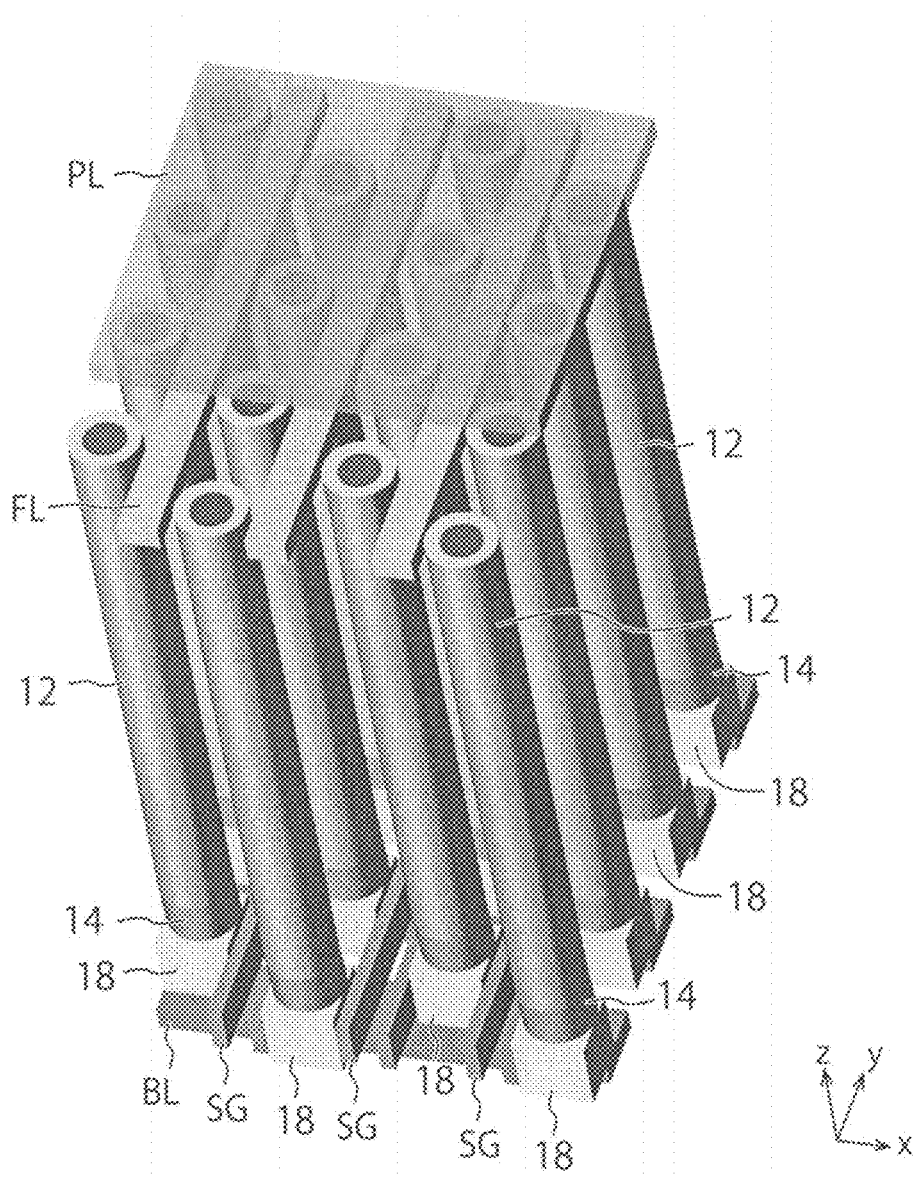
FIG. 5 is a perspective view showing a magnetic memory of a first embodiment.

FIG. 5 shows a perspective view of the magnetic memory of the present embodiment when the plurality of magnetic members 12 are densely disposed. The magnetic memory includes the magnetic members 12 disposed in 4 rows and 4 columns. The magnetic memory can be more densely integrated.

Next, data write and data read operations in the magnetic memory of the first embodiment will be described with reference to FIGS. 6A to 6D. In the following description, m and n are natural numbers of 4 or more, and the memory unit $10_{ij}$ (i=1 to m, j=1 to n) in m rows and n columns is provided as a magnetic memory.

Write Method

Regarding the write method in the magnetic memory of the present embodiment, in the magnetic memory provided with the memory units $10_{11}$ to $10_{44}$ arranged in 4 rows and 4 columns, among the memory units $10_{11}$, $10_{21}$, $10_{31}$, and $10_{41}$ arranged in the y direction along which the field line $FL_1$ extends, the information "1" is written in the memory units $10_{11}$ and $10_{31}$, and the information "0" is written in the memory units $10_{21}$ and $10_{41}$. Here, the information "1" indicates that the magnetization direction of the magnetic member $12_{ij}$ (i=1 to 4, j=1 to 4) is one of an outward or inward direction in the radial direction, and the information "0" indicates the other one of the outward or inward directions.

Figure 6A:
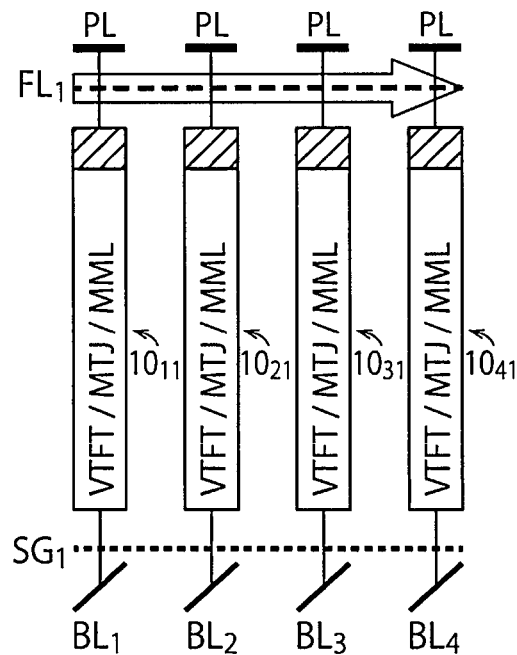
FIGS. 6A to 6D are views showing a write method of the magnetic memory according to the first embodiment.

First, as shown in FIG. 6A, a write current flowing from left to right on the drawing is passed through the field line $FL_1$ by the control circuit 100. Due to this write current, a magnetic field of a clockwise direction is generated around the field line $FL_1$. A magnetic field is induced also in the yoke 40 surrounding the field line $FL_1$ by this magnetic field. Due to the magnetic field, the information "1" is written to the second end portion $12b$ of each of the magnetic members $12_{11}$, $12_{21}$, $12_{31}$, and $12_{41}$ of the memory units $10_{11}$, $10_{21}$, $10_{31}$, and $10_{41}$ positioned below the field line $F_1$.

Figure 6B:
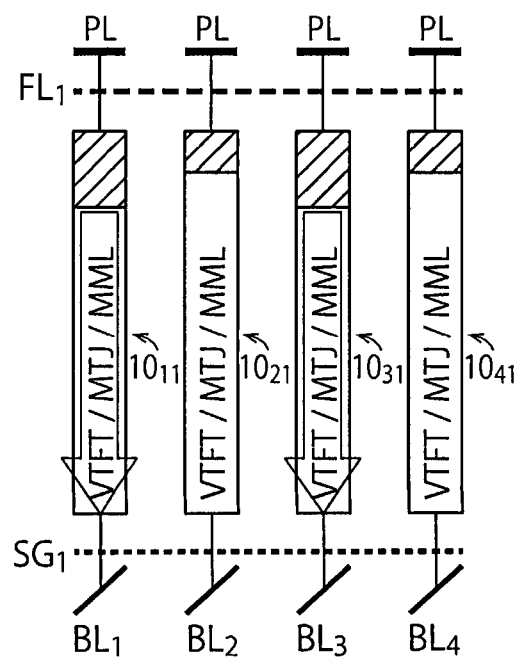

Next, as shown in FIG. 6B, a shift current is selectively supplied to the memory units $10_{11}$ and $10_{31}$ to store the written information "1", the magnetic wall is moved, and the written information is moved to the side of the first end portion $12a$ of each of the magnetic members $12_{11}$ and $12_{31}$. The shift current is supplied by the control circuit 100 between the plate electrode PL and each of the bit wirings $BL_1$ and $BL_3$ respectively coupled to the memory units $10_{11}$ and $10_{31}$. In this way, the information "1" can be written to the selected memory units $10_{11}$ and $10_{31}$.

Figure 6C:
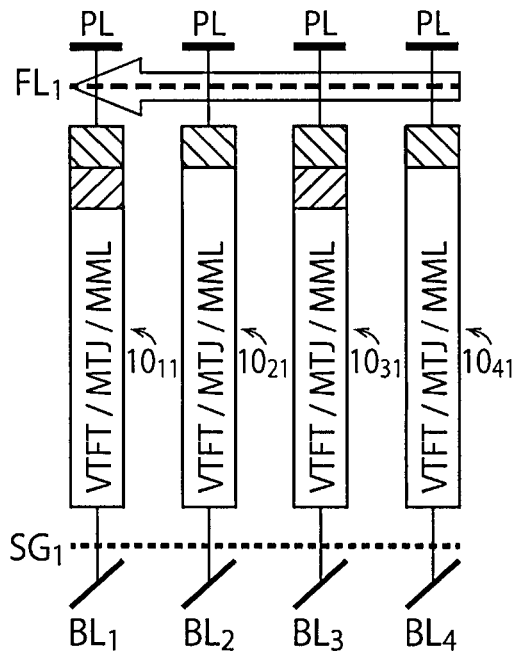

Subsequently, as shown in FIG. 6C, a write current flowing from right to left on the drawing is passed through the field line $FL_1$ by the control circuit 100. That is, this write current flows in the opposite direction to that of the write current described with reference to FIG. 6A. Due to this write current, a magnetic field in the direction opposite to that shown in FIG. 6A is generated around the field line $FL_1$, and a magnetic field is also induced around the yoke 40 surrounding the field line $FL_1$. Due to the magnetic field, information "0" is written to the second end portion $12b$ of each of the magnetic members $12_{11}$, $12_{21}$, $12_{31}$, and $12_{41}$ of the memory unit $10_{11}$, $10_{21}$, $10_{31}$, and $10_{41}$ positioned below the field line $F_1$.

Figure 6D:
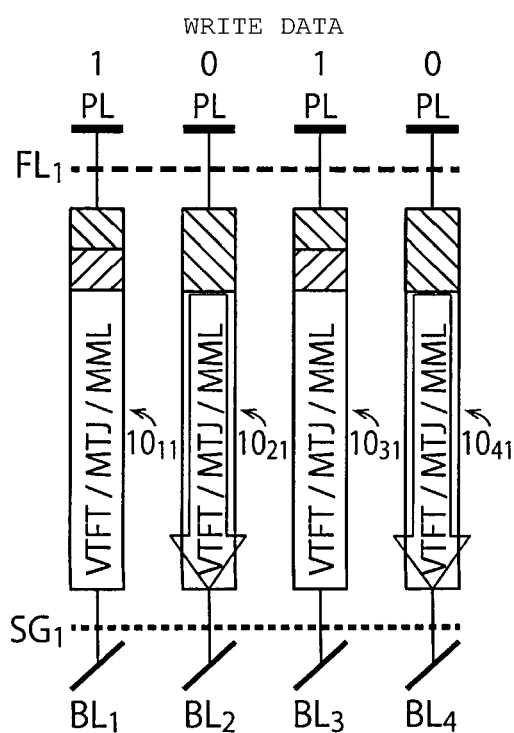

Next, as shown in FIG. 6D, a shift current is selectively supplied to the memory units $10_{21}$ and $10_{41}$ to store the written information "0", the magnetic wall is moved, and the written information is moved to the side of the first end portion $12a$ of each of the magnetic members $12_{21}$ and $12_{41}$. The shift current is supplied by the control circuit 100 between the plate electrode PL and each of the bit wirings $BL_2$ and $BL_4$ respectively coupled to the memory units $10_{21}$ and $10_{41}$. In this way, the information "0" can be written to the selected memory units $10_{21}$ and $10_{41}$. By the above write operation, the information "1" is written to the memory unit $10_{11}$ and $10_{31}$, and information "0" can be written to the memory unit $10_{21}$ and $10_{41}$.

As described above, in the present embodiment, a first write current is passed through the field line $FL_1$, first information is collectively written to the memory units $10_{ij}$ arranged along the field line $FL_1$, and a shift current is selectively supplied to a first memory unit group to store the first information that has been written. Subsequently, a second write current in the direction opposite to that of the first write current is passed through the field line $FL_1$ and second information different from the first information is collectively written to the memory units $10_{ij}$ arranged along the field line $FL_1$, the shift current is selectively supplied to a second memory unit group different from the first memory unit group, and the second information is stored. That is, since the write is performed such that the information is collectively written to the memory units $10_{ij}$ arranged along the field line $FL_1$, an increase in write energy consumption per bit can be prevented.

Read Operation

Next, the read operation will be described with reference to FIGS. 1 and 2. Here, information is read from the memory unit $10_{11}$ among the memory units $10_{11}$ to $10_{44}$ shown in FIG. 1. First, a voltage is applied by the control circuit 100 to the gate electrode portion $SG_1$ of the vertical thin film transistor $18_{11}$, and the vertical thin film transistor $18_{11}$ becomes the on-state. When the information to be read is positioned at the lowermost portion of the magnetic member 12 of the memory unit $10_{11}$, (that is, in the area closest to the MTJ element $14_{11}$), corresponding to the information stored at the lowermost portion of the magnetic member $12_{11}$, the magnetization direction of the free layer $14a$ of the MTJ element $14_{11}$ is also changed by the leakage magnetic field from the information. The control circuit 100 supplies a read current between the bit wiring $BL_1$ and the plate electrode PL to read the information from the MTJ element $14_{11}$. The read information corresponds to the resistance state of the MTJ element $14_{11}$. When the resistance state of the MTJ element $14_{11}$ is high, it corresponds to, for example, a state in which the magnetization directions of the free layer $14a$ and the fixed layer $14c$ of the MTJ element $14_{11}$ are different from each other (for example, the antiparallel state), and when the resistance state of the MTJ element $14_{11}$ is low, it corresponds to a state in which the magnetization directions of the free layer $14a$ and the fixed layer $14c$ of the MTJ element $14_{11}$ are the same (for example, the parallel state).

When the information to be read are not present at the lowermost portion of the magnetic member $12_{11}$ of the memory unit $10_{11}$, a shift current is supplied between the bit wiring $BL_1$ and the plate electrode PL by the control circuit 100, and the information to be read is moved to be positioned at the lowermost portion of the magnetic member $12_{11}$. After that, the information can be read by performing the read operation mentioned above.

As described above, according to the present embodiment, since the write is performed such that the information is collectively written to the memory units $10_j$ arranged along the field line $FL_1$, an increase in write energy consumption per bit can be prevented.

Further, according to the present embodiment, in the magnetic member $12_j$ (i, j=1 and 2), since the first end portion $12a$ is electrically coupled to the magnetoresistive element $14_{ij}$ and the second end portion $12b$ is electrically coupled to the plate electrode PL, it is possible to highly integrate the magnetic member $12_{ij}$. Further, in the present embodiment, the vertical thin film transistor $18_{ij}$ is used as a selection element that selects the memory unit $10_{ij}$ (i, j=1 and 2). Accordingly, as compared with a case where a two-terminal switching element is used as the selection element, the hold current required for the two-terminal switching element becomes unnecessary, and the margin between the read current value and the shift current value can be expanded.

Second Embodiment

Figure 7:
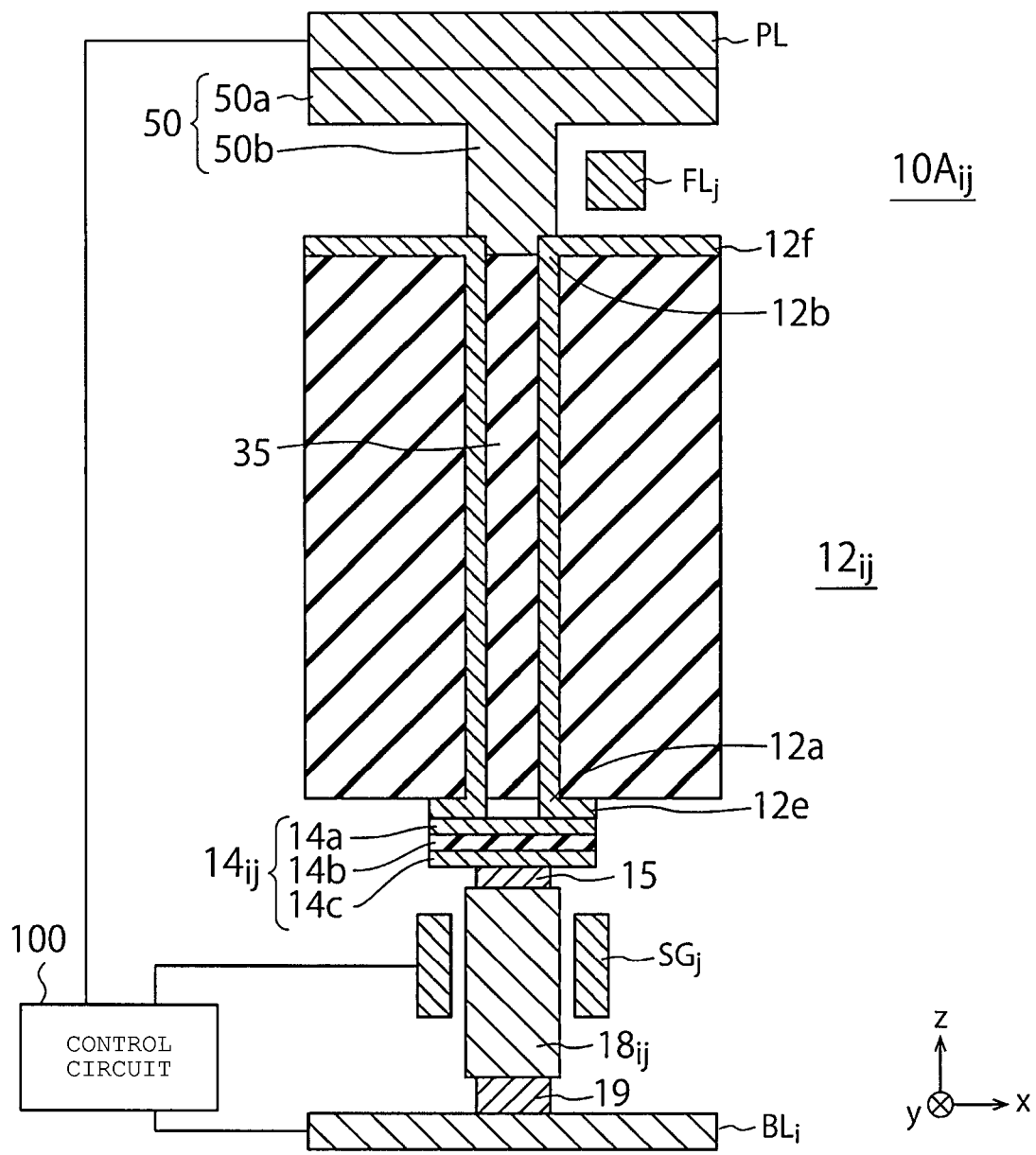
FIG. 7 is a cross-sectional view showing a memory unit of a magnetic memory according to a second embodiment.

The magnetic memory according to a second embodiment is shown in FIG. 7. The magnetic memory of the second embodiment includes at least one memory unit $10A_{ij}$ (i, j=1 and 2), and the memory unit $10A_{ij}$ does not have the yoke 40 covering the field line $FL_j$, the non-magnetic conductor 30, and the non-magnetic conductive layer 13 unlike the memory unit $10_{ij}$ of the first embodiment shown in FIG. 2, and includes a yoke 50 instead.

The memory unit $10A_{ij}$ (i, j=1 and 2) includes the magnetic member $12_{ij}$, the magnetoresistive element $14_{ij}$, the non-magnetic conductive layer 15, the vertical thin film transistor $18_{ij}$, the non-magnetic conductive layer 19, the bit wiring $BL_i$, the yoke 50, the plate electrode PL, and the field line $FL_j$.

The yoke 50 includes a first portion $50a$ and a second portion $50b$. The first portion $50a$ has the same shape as the plate electrode PL shown in FIG. 1, and is disposed directly below and in contact with the plate electrode PL. The second portion $50b$ is provided between the first portion $50a$ and the memory unit $10A_{ij}$ (i, j=1 and 2). The second end portion $12b$ and the flange portion $12f$ of the magnetic member $12_{ij}$ of the memory unit $10A_{ij}$ are electrically coupled to the first portion $50a$ via the second portion $50b$.

In the magnetic member $12_{ij}$ (i, j=1 and 2), the first end portion $12a$ is electrically coupled to the free layer $14a$ of the magnetoresistive element $14_{ij}$ via the flange portion $12e$. The fixed layer $14c$ of the magnetoresistive element $14_{ij}$ (i, j=1 and 2) is electrically coupled to one end of the vertical thin film transistor $18_{ij}$ via the non-magnetic conductive layer 15. The other end of the vertical thin film transistor $18_{ij}$ (i, j=1 and 2) is electrically coupled to the bit wiring $BL_i$ via the non-magnetic conductive layer 19. The bit wiring $BL_i$ (i=1 and 2) extends along the x direction, the gate electrode portion $SG_j$ of the vertical thin film transistor $18_{ij}$ (i, j=1 and 2) extends along the y direction, and the field line $FL_j$ extends along the y direction.

The write operation in the magnetic memory configured in this way is performed in the same manner as the magnetic memory of the first embodiment described with reference to FIG. 1. When a write current is supplied by the control circuit 100 to the field line $FL_j$ (j=1 and 2), a current magnetic field is generated around the field line $FL_j$, and the current magnetic field is strengthened by the yoke 50, so that information is written to the second end portion $12b$ of the magnetic member 12. The read operation is performed in the same manner as the magnetic memory of the first embodiment.

In the second embodiment also, as in the first embodiment, since the write is performed such that the information is collectively written to the memory units $10_{ij}$ arranged along the field line $FL_1$, an increase in write energy consumption per bit can be prevented.

Further, in the magnetic memory of the second embodiment, as in the first embodiment, since in the magnetic member $12_{ij}$ (i, j=1 and 2), the first end portion $12a$ is electrically coupled to the magnetoresistive element 14 and the second end portion $12b$ is electrically coupled to the plate electrode PL, it is possible to highly integrate the magnetic member $12_{ij}$. Further, in the present embodiment, the vertical thin film transistor $18_{ij}$ (i, j=1 and 2) is used as a selection element that selects the memory unit 10A. Accordingly, as compared with a case where a two-terminal switching element is used as the selection element, the hold current required for the switching element becomes unnecessary, and the margin between the read current value and the shift current value can be expanded.

Modification Example

The magnetic memory according to a modification example of the second embodiment will be described with reference to FIG. 8. The magnetic memory of the modification example includes memory units $10A_{ij}$ (i, j=1 and 2) arranged in m rows and n columns, where m and n are natural numbers. The memory units $10A_{ij}$ have the same configuration as the memory unit $10A_{ij}$ (i, j=1 and 2) shown in FIG. 7.

Figure 8:
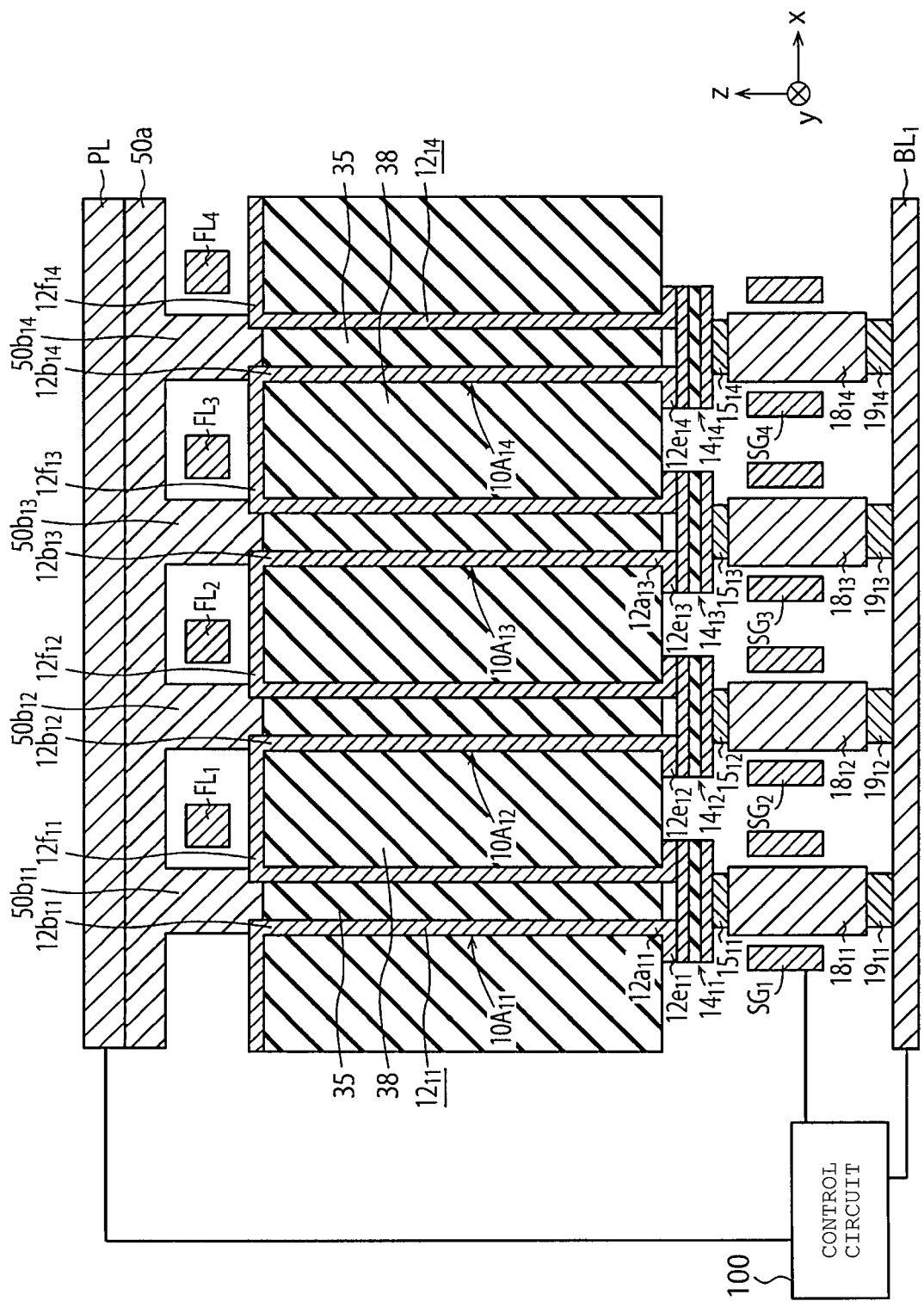
FIG. 8 is a cross-sectional view showing a memory unit of a magnetic memory according to a modification example of the second embodiment.

FIG. 8 shows a cross section of the magnetic memory of the modification example cut along a row, for example, the first row. As shown in FIG. 8, the magnetic memory of the modification example includes four memory units $10A_{11}$ to $10A_{14}$ in the first row. Each memory unit $10A_{ij}$ (j=1 to 4) includes the magnetic member $12_{ij}$, the magnetoresistive element $14_{ij}$, the vertical thin film transistor $18_{ij}$, a non-magnetic conductive layer $19_{ij}$, the yoke 50, the field line $FL_j$, and the plate electrode PL. Further, the yoke 50 includes the first portion $50a$ having the same shape as the plate electrode PL and including, for example, a soft magnetic member, and second portion $50b_{11}$ to $50b_{14}$ including, for example, a soft magnetic member. The second portion $50b_{ij}$ (j=1 to 4) is provided corresponding to the memory unit $10A_{ij}$, and is electrically coupled to the magnetic member $12_{ij}$ of the memory unit $10A_{ij}$ corresponding to the first portion $50a$.

Each magnetic member $12_{11}$ (j=1 to 4) has a first end portion $12a_{ij}$, as in the case of the second embodiment shown in FIG. 7, is electrically coupled to one end (for example, the free layer $14a$ shown in FIG. 7) of the magnetoresistive element $14_{ij}$ via a flange portion $12e$, and a second end portion $12b_{ij}$ is electrically coupled to the corresponding second portion $50b_{ij}$ of the yoke 50 via a flange portion $12f_{11}$. In the magnetoresistive element $14_{ij}$ (j=1 to 4), the other end (fixed layer 14c shown in FIG. 7) is electrically coupled to one end of the vertical thin film transistor $18_{ij}$ via a non-magnetic conductive layer $15_{ij}$. In each magnetic member $12_{ij}$ (j=1 to 4), the insulator portion 35 is disposed in a cylinder. An insulating film 38 is provided between adjacent magnetic members. The flange portions $12f_{ij}$ and $12f_{1\ j+1}$ of the adjacent magnetic members $12_{ij}$ and $12_{ij+1}$ (j=1 to 3), are coupled to each other.

The other end of the vertical thin film transistor $18_{ij}$ (j=1 to 4) is electrically coupled to the bit wiring $BL_1$ via the non-magnetic conductive layer $19_{ij}$ The bit wiring $BL_i$ (i=1 to 4) is provided corresponding to each row of the memory units $10A_{ij}$, and the memory units $10A_{ij}$ of each row share the bit wiring $BL_i$. Further, the gate electrode portion $SG_j$ (j=1 to 4) of the vertical thin film transistor $18_{ij}$ is shared by the memory units $10A_{ij}$ of each row as in the case of the first embodiment shown in FIG. 1.

Further, the field line $FL_j$ is provided corresponding to each memory unit $10A_{ij}$ (j=1 to 4). Each field line $FL_j$ (j=1 to 4) is disposed between the flange portion $12f_{ij}$ of the magnetic member $12_{ij}$ of the corresponding memory unit $10A_{ij}$ and the yoke 50.

When information is written to the memory unit $10A_{ij}$ (j=1 to 4) configured in this way, it is performed by supplying the write current by the control circuit 100 to the corresponding field line $FL_j$. The shift operation that shifts the written information and the read operation of the information are performed in the same manner as in the method described in the first embodiment.

In the modification example also, as in the first embodiment, since the write is performed such that the information is collectively written to the memory units $10A_{ij}$ arranged along the field line $FL_j$, an increase in write energy consumption per bit can be prevented.

In the magnetic memory of the modification example configured in this way, as in the first embodiment, since in the magnetic member $12_{ij}$ (j=1 to 4), the first end portion $12a_{ij}$ is electrically coupled to the magnetoresistive element $14_{ij}$ and the second end portion $12b_{ij}$ is electrically coupled to the plate electrode PL, it is possible to highly integrate the magnetic member $12_{ij}$. In the present embodiment, the vertical thin film transistor $18_{11}$ is used as a selection element that selects the memory unit $10A_{ij}$ (j=1 to 4). Accordingly, as compared with a case where a two-terminal switching element is used as the selection element, the hold current required for the switching element becomes unnecessary, and the margin between the read current value and the shift current value can be expanded.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A magnetic memory, comprising:
    an electrode extending along a plane including a first direction and a second direction intersecting the first direction;
    first and second wirings extending along the first direction;
    a first magnetic member including a first portion electrically coupled to the first wiring and a second portion electrically coupled to the electrode, the second portion being nearer to the electrode than the first portion, the first magnetic member extending along a third direction intersecting the first and second directions;
    a second magnetic member including a third portion electrically coupled to the second wiring and a fourth portion electrically coupled to the electrode, the fourth portion being nearer to the electrode than the third portion, the second magnetic member extending along the third direction;
    a third wiring extending along the second direction;
    a fourth wiring extending along the first direction;
    a third magnetic member including a fifth portion electrically coupled to the fourth wiring and a sixth portion electrically coupled to the electrode, the sixth portion being nearer to the electrode than the fifth portion, the third magnetic member extending along the third direction; and
    a control circuit electrically coupled to the first, second, third, and fourth wirings and the electrode, wherein
    the third wiring extends between the electrode and each of the second, fourth, and sixth portions, and
    the control circuit is configured to:
        supply a first current to the third wiring to generate a magnetic field and magnetize in a first magnetization direction a magnetic domain of each of the second, fourth, and sixth portions, the magnetic domain storing information represented by magnetization directions thereof,
        supply a second current between the electrode and each of the first and second wirings, without supplying the second current between the electrode and the fourth wiring, to respectively shift the magnetic domains of the second and fourth portions towards the first and third portions,
        supply a third current to the third wiring to magnetize in a second magnetization direction opposite to the first magnetization direction the magnetic domain of each of the second, fourth, and sixth portions, and
        supply a fourth current between the electrode and the fourth wiring, without supplying the fourth current between the electrode and each of the first and second wirings, to shift the magnetic domain of the sixth portion towards the fifth portion.

2. The magnetic memory according to claim 1, further comprising:
    a first magnetoresistive element including a first terminal electrically coupled to the first portion of the first magnetic member and a second terminal;
    a first transistor including a first channel layer extending along the third direction and a first gate electrode portion at least partially covering the first channel layer, wherein one end of the first channel layer is electrically coupled to the second terminal of the first magnetoresistive element and the other end of the first channel layer is electrically coupled to the first wiring;
    a second magnetoresistive element including a third terminal electrically coupled to the third portion of the second magnetic member and a fourth terminal; and
    a second transistor including a second channel layer extending along the third direction and a second gate electrode portion at least partially covering the second channel layer, wherein one end of the second channel layer is electrically coupled to the fourth terminal of the second magnetoresistive element and the other end of the second channel layer is electrically coupled to the second wiring, wherein the first and second gate electrode portions are electrically coupled to the control circuit.

3. The magnetic memory according to claim 1, further comprising:
- a first non-magnetic material portion extending along the third direction between the electrode and the second portion of the first magnetic member;
- a second non-magnetic material portion extending along the third direction between the electrode and the fourth portion of the second magnetic member; and
- a first magnetic material portion partially surrounding the third wiring.

4. The magnetic memory according to claim 3, wherein
- each of the first and second magnetic members has a cylindrical shape,
- one end of the first non-magnetic material portion is coupled to the electrode, and the other end is coupled to the second portion of the first magnetic member inside the first magnetic member, and
- one end of the second non-magnetic material portion is coupled to the electrode, and the other end is coupled to the fourth portion of the second magnetic member inside the second magnetic member.

5. The magnetic memory according to claim 1, further comprising:
- a second magnetic material portion including:
  - a first portion extending along the plane and coupled to the electrode,
  - a second portion between the first portion of the second magnetic material portion and the second portion of the first magnetic member, and
  - a third portion between the first portion of the second magnetic material portion and the fourth portion of the second magnetic member.

6. The magnetic memory according to claim 5, wherein the first portion of the second magnetic material portion has the same shape as the electrode when viewed from the third direction.

7. The magnetic memory according to claim 5, wherein each of the first and second magnetic members has a cylindrical shape.

8. The magnetic memory according to claim 1, further comprising:
- a non-magnetic insulator portion extending along the third direction and surrounded by the first magnetic member, wherein
- the first magnetic member has a cylindrical shape and includes a first protruding portion, a first depressed portion, a second protruding portion, and a second depressed portion arranged in this order from the second portion to the first portion and each surrounding the non-magnetic insulator portion,
- an outer diameter of the first protruding portion is greater than an outer diameter of each of the first and second depressed portions, and
- an outer diameter of the second protruding portion is greater than the outer diameter of each of the first and second depressed portions.

9. The magnetic memory according to claim 1, wherein the third wiring is electrically isolated from the first to third magnetic members.

* * * * *